INVENTOR.
PAUL W. McCONNAUGHEY
BY

HIS ATTORNEYS 2,941,870
Patented June 21, 1960

2,941,870
SOLVENT EXTRACTION DEVICE

Paul W. McConnaughey, Wilkinsburg, Pa., assignor to Mine Safety Appliances Company, Pittsburgh, Pa., a corporation of Pennsylvania Filed Dec. 9, 1955, Ser. No. 552,219

8 Claims. (Cl. 23—259)

This invention relates to apparatus for separating and concentrating a sample of particulate matter by a solvent extraction to facilitate testing or treating the extracted sample.

It is among the objects of this invention to provide apparatus for carrying out simply and inexpensively the combined procedures of separating by solvent extraction a sample of particulate matter, evaporating the solvent, and concentrating the particulate matter extracted to facilitate further testing or treating it.

In accordance with this invention, there is provided a porous sampling and testing means. The sampling means may be the central portion of a disc of filtering material, on which a sample of particulate matter has been collected; and the testing means may be the peripheral portion of the same disc to which the sample is to be transferred by solvent extraction. Alternatively, the sampling means may be a disc of filtering material, and the testing means a separate disc, or ring, of suitable adsorbent material held in solvent transfer engagement with the sampling disc. In either case, the sampling and testing means are held between two plates with the testing means projecting beyond the edges of the plates, and the upper plate being provided with a hole for admitting a solvent to the sampling means, so that the solvent will dissolve particulate matter thereon and carry it to the projecting area of the testing means, where the solvent will evaporate. Preferably, that projecting area is less than the sample collecting area of the sampling means, so that the extracted particulate matter will be concentrated on the testing means.

The invention is illustrated in the accompanying drawings, in which.

Figure 1:
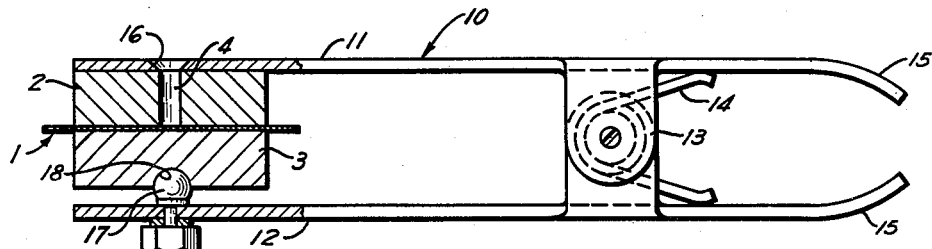
Fig. 1 is an elevation of the solvent extraction device.
Figure 2:
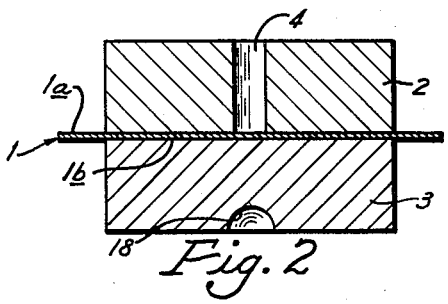
Fig. 2 is an enlarged sectional elevation of the plates and the sampling and testing means of Fig. 1.
Figure 3:
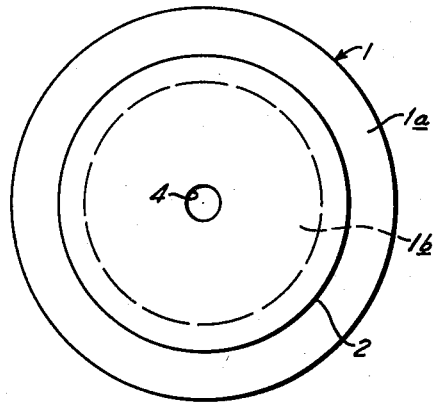
Fig. 3 is a plan view of the elements shown in Fig. 2.

Referring to Figs. 1 to 3 of the drawings, a disc 1, preferably circular, is made of filtering material suitable for collecting a sample of particulate matter to be tested. This filtering material may be a fiberglass web, filter paper, or other type of permeable substance suitable for separating and collecting particulate matter from a gas or a solution passed therethrough. In those cases where the filtering material used to collect a sample of particulate matter is also suitable for testing the extracted sample, a single homogeneous disc can serve both as the sampling and testing means. In that event, the outer portion of the disc 1a represents the testing means, while the central inner portion 1b represents the sampling means. The circular boundary between the two is shown by broken lines in Fig. 3. In collecting a sample of particulate material on such a dual purpose disc, the testing portion of the disc should be suitably masked while the gas or liquid is passed through the sampling portion to separate and collect the particulate matter thereon. In this way, the sampling portion alone of the disc will initially have deposited thereon the particulate matter to be tested.

Figure 4:
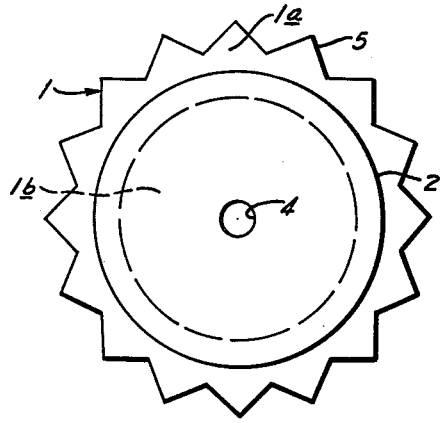
Fig. 4 is a plan view of those same elements, showing a modification of the projecting margin of the testing means.

The combined sampling and testing disc 1, having particulate matter deposited on the sampling portion alone, is placed between two plates 2 and 3, which are of non-absorbent and non-permeable material, for example, glass, stainless steel, the plastic "Teflon," or other suitable material. In addition, the plates should be of a material that is inert to the solvents or reagents to be used in the extraction of the particulate matter from the sampling means, as well as inert to the particulate matter itself. Each of the plates 2 and 3 are preferably circular and of the same diameter, which should be larger than the diameter of the sampling portion 1b of the disc, but less than the diameter of the testing portion 1a, so that the latter portion will project beyond the edges of the plates when the disc and plates are assembled concentrically. However, if desired, one of the plates (preferably the lower one) can be as large as or larger than the disc itself. The upper plate 2 is provided with a hole 4, extending through the plate from top to bottom and preferably the center of the plate, through which solvent may be admitted to the central portion of the disc 1. The testing portion 1a of the disc may have a smooth circular margin, as shown in Fig. 3, or it may have a sawtoothed margin, as shown in Fig. 4. In each case, the projecting area of the testing portion is preferably smaller than the area of the sampling portion, thereby effecting concentration of the particulate matter extracted from the latter. As between the marginal forms shown in Figs. 3 and 4, the sawtoothed margin of Fig. 4 provides the smaller projecting area with resulting greater concentration of the extracted matter. It also provides numerous segmented areas 5 for the deposit of the extracted material and may be found more convenient in making multiple tests of that matter. Of course, other marginal configurations of the projecting testing means may be devised.

When the sampling and testing disc 1 has been placed concentrically between the plates 2 and 3, the assembly may be conveniently held in a suitable clamp, such as the clamp 10 in Fig. 1, in which the jaws 11 and 12 are pivotally connected by a pin 13 and urged together by a spring 14. Extensions of each jaw beyond the pivot point provide handles 15 for opening the clamp. The upper jaw 11 is provided with a hole 16 adapted to register with the hole 4 in the upper plate 2 when the plates are inserted between the jaws. To assure uniform clamping pressure on the sampling and testing disc 1 held between the plates, the lower plate 3 may be supported on a universal ball joint 17 mounted on the lower jaw 12. A recess 18 in the bottom of the lower plate is provided to receive the ball of that joint.

In using the foregoing apparatus, the plates are held or supported horizontally in the clamp 10, and small amounts of a suitable solvent are admitted through the holes 16 and 4 to the sampling portion 1b of the disc 1. If desired, the solvent may be admitted fast enough to fill the hole 4, thereby providing a certain amount of hydrostatic pressure to the solvent, which will accordingly flow by gravity and capillary action through the sampling portion 1b to the projecting testing portion 1a of the disc 1 and at the same time extracting the soluble matter from the former and transferring it to the latter, where the solvent will evaporate and deposit the extracted matter. This deposit may then be subjected to any further treatment or testing that is desired, such as the addition of various reagents, burning to ash, etc. Such further treatment and testing may be made in situ, or portions of the testing area may be removed for that purpose.

Figure 5:
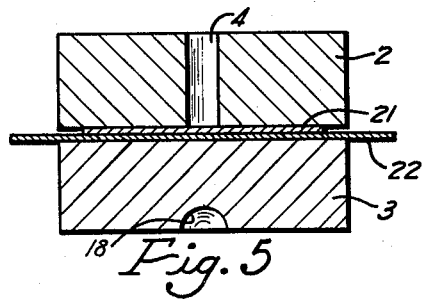
Fig. 5 is a sectional elevation of the same elements, in which the sampling and testing means have been modified.
Figure 6:
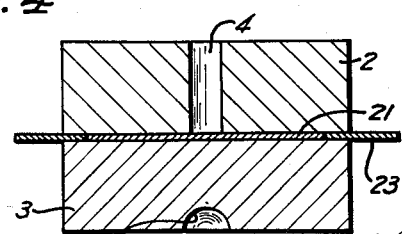
Fig. 6 is a sectional elevation of the same elements, in which the sampling and testing means have been further modified.

The combined sampling and testing disc described above will not in many cases be suitable for the extraction and testing of some samples. Frequently the material best suited for collecting the sample will not be most suitable for use in testing it. For example, the filtering material used to collect the sample may be a filter paper impregnated with various adsorbents, such as carbon or silica gel, or may be made of other filtering substances that for one reason or another are not suitable as a testing material for the extracted matter. Accordingly, the present invention is not restricted to the use of a single filtering disc used both to collect the sample and to test it. There is shown in Fig. 5 a modification of the invention, in which the sampling and testing means are separate discs adapted to be held in solvent transfer engagement between the plates 2 and 3. The sampling disc 21 is of lesser diameter than the plates, while the testing disc 22 is of larger diameter to provide a peripheral exposed portion when the two discs are clamped in contact with each other between the plates. Likewise, in Fig. 6, the sampling and testing means are again separate elements, the sampling means being the same disc 21 as in Fig. 5, while the testing means is in the form of a ring 23, the inner margin of which is adapted to abut the margin of the sampling disc in solvent transfer engagement therewith. The outer margin of the testing means in both Figs. 5 and 6 may, of course, be either smooth as in Fig. 3 or sawtoothed as in Fig. 4, or of any other desirable form. The assembled elements of Figs. 5 and 6 are held in the clamp 10 and used in the same way as previously described in connection with Figs. 1 to 3.

As an example of the use of the invention, in the form illustrated in Fig. 5, a sample of airborne dust containing micro amounts of fluorescein in particulate form was collected on the sampling disc 21, which was a fiberglass web filter, by placing that disc in a suitable holder (not shown) and drawing the air through this filter by a pump. When a sufficient sample of fluorescein had been deposited on this filter disc, it was placed concentrically on top of a testing disc 22, represented by a cellulose filter paper. The two discs were then sandwiched between polyethylene plates 2 and 3 and placed in the clamp 10, which was suitably supported with the plates horizontal. Ethanol in the amount of 0.3 cc. was added slowly through the hole 4 in the upper plate onto the central portion of the sampling disc 21, in which it permeated horizontally and extracted the soluble fluorescein from the insoluble materials on and in the sampling disc. The extracted fluorescein was carried by the solvent to the projecting exposed area of the testing disc 22, where the ethanol evaporated and left the fluorescein as a deposit. The area of the exposed portion of the testing disc was considerably less than the area of the sampling disc; and, due in part to the resulting concentration of the deposit on the testing area, mere traces of fluorescein there produced a distinct fluorescein green stain. Colorimetric quantitative determinations of the amount of fluorescein in the sample were not made, but they could have been made by calibrating the apparatus by using known amounts of fluorescein and preparing color standards.

As used in the appended claims, the term "sampling means" refers to material, or a portion thereof, on which particulate matter has been collected, but is not tested; and the term "testing means" refers to material, or a portion thereof, on which the particulate matter is tested, after having been transferred from the sampling means to the testing means by solvent extraction.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A combination solvent extraction and testing device, comprising porous sampling and testing means having a defined sampling area on which particulate matter is deposited and a marginal testing area, means for transferring the particulate matter by solvent extraction from the sampling to the testing area, said means including a pair of opposed plates, one of said plates being imperforate and the other being provided with an opening for admitting a solvent, said plates receiving the porous sampling and testing means between them with the sampling area entirely confined between the plates and with the testing area projecting symmetrically with respect to said opening beyond at least one of the plates, whereby a solvent admitted to the sampling area will extract particulate matter thereon and transfer it to the testing area.

2. A device according to claim 1, in which the sampling and testing means is a homogeneous disc, the central part of which contains the sampling area and the peripheral part of which contains the testing area.

3. A device according to claim 1, in which the sampling and testing means includes a first disc of filtering material containing the sampling area and a second and larger disc of adsorbent material containing the testing area, the second disc being in contact with and projecting beyond the first disc.

4. A device according to claim 1, in which the sampling and testing means includes a disc of filtering material containing the sampling area and a ring of absorbent material surrounding the disc and in marginal contact therewith and containing the testing area.

5. A device according to claim 1, in which the testing area is less than the sampling area, thereby increasing the concentration of the extracted particulate matter transferred to the testing area.

6. A device according to claim 5, in which the margin of the testing area is serrated.

7. A device according to claim 1 that includes, as an additional element, means for clamping the sampling and testing means between the plates.

8. A device according to claim 1, in which the plate provided with an opening is of substantial thickness and in which the opening therethrough forms a well for receiving and retaining a solvent and for admitting the solvent to the central part of the sampling means.

References Cited in the file of this patent

UNITED STATES PATENTS

| 1,012,639 | Holmgren | Dec. 26, 1911 |
| 2,113,063 | Stryker et al. | Apr. 5, 1938 |
| 2,123,690 | Wright | July 12, 1938 |
| 2,397,438 | Schmid | Mar. 26, 1946 |
| 2,483,108 | Silverman et al. | Sept. 27, 1949 |
| 2,606,101 | Sundstrom | Aug. 5, 1952 |
| 2,680,060 | Natelson | June 1, 1954 |
| 2,785,057 | Schwab et al. | Mar. 12, 1957 |

FOREIGN PATENTS

| 396,672 | Great Britain | Aug. 10, 1933 |
| 647,921 | Great Britain | Dec. 28, 1950 |

OTHER REFERENCES

Hoogeveen: "Chemistry and Industry," vol. 59, pp. 550–556, August 3, 1950.